United States Patent [19]

Gonzalez

[11] Patent Number: 5,562,764
[45] Date of Patent: Oct. 8, 1996

[54] PROCESS FOR PREPARING IMPROVED $TIO_2$ BY SILICON HALIDE ADDITION

[75] Inventor: Raul A. Gonzalez, Newark, Del.

[73] Assignee: E. I. du Pont de Nemours and Company, Wilmington, Del.

[21] Appl. No.: 494,642

[22] Filed: Jun. 23, 1995

Related U.S. Application Data

[63] Continuation-in-part of Ser. No. 267,329, Jun. 28, 1994, abandoned.

[51] Int. Cl.⁶ ............................................. C09C 1/36
[52] U.S. Cl. ..................... 106/437; 423/612; 423/613
[58] Field of Search ......................... 106/437; 423/612, 423/613, 614

[56] References Cited

U.S. PATENT DOCUMENTS

| | | | |
|---|---|---|---|
| 2,980,509 | 4/1961 | Frey | 23/202 |
| 3,214,284 | 10/1965 | Wilson | 106/300 |
| 3,434,799 | 3/1969 | Wilson | 23/202 |
| 3,463,610 | 8/1969 | Groves et al. | 23/202 |
| 3,486,913 | 12/1969 | Zirngibl et al. | 106/437 |
| 3,531,247 | 9/1970 | Comyns et al. | 23/202 |
| 3,552,995 | 1/1971 | Powell | 117/69 |
| 3,615,202 | 10/1971 | Stern | 106/442 |
| 3,617,216 | 11/1971 | Arkless | 423/613 |
| 3,640,745 | 2/1972 | Darr et al. | 106/437 |
| 3,642,442 | 2/1972 | Hoekje et al. | 423/613 |
| 3,650,694 | 3/1972 | Allen | 423/613 |
| 3,663,283 | 5/1972 | Hebert et al. | 106/437 |
| 3,856,929 | 2/1974 | Angerman et al. | 423/613 |

FOREIGN PATENT DOCUMENTS

| | | | |
|---|---|---|---|
| 0486632 | 5/1992 | Australia | 423/613 |
| 815891 | 7/1959 | United Kingdom . | |
| 1069071 | 10/1963 | United Kingdom . | |
| 992414 | 5/1965 | United Kingdom . | |

*Primary Examiner*—Paul Marcantoni

[57] ABSTRACT

A process for producing substantially anatase-free $TiO_2$ by addition of a silicon halide in a reaction of $TiCl_4$ and an oxygen-containing gas in a plug flow reactor is disclosed. Pigmentary properties such as gloss and CBU are enhanced without loss of durability.

8 Claims, No Drawings

PROCESS FOR PREPARING IMPROVED TIO₂ BY SILICON HALIDE ADDITION

CROSS REFERENCE TO RELATED APPLICATIONS

This application is a continuation-in-part of U.S. patent application Ser. No.08/267,329, filed 28 June 1994, now abandoned.

BACKGROUND OF THE INVENTION

This invention relates to a process for producing substantially anatase-free $TiO_2$ in a vapor phase oxidation of $TiCl_4$ in a plug flow reactor by addition of a silicon halide at a process temperature from about 1200° C. to about 1600° C. at one or more points downstream of where an oxygen-containing gas and $TiCl_4$ are initially contacted.

The process for producing $TiO_2$ pigment by reacting $O_2$-containing gas and $TiCl_4$ at temperatures ranging from 900° to 1600° C. in a vapor phase is known. The resulting hot gaseous suspension of $TiO_2$ particles and free chlorine are discharged from the reactor and must be quickly cooled below 600° C. within about 5 to 100 seconds. This cooling is accomplished in a conduit, i.e., a flue so that undesired $TiO_2$ particle size growth is prevented and particle agglomeration is minimized. Pigment product properties such as carbon black undertone (CBU) and gloss are a function of primary particle size and particle agglomeration, respectively. If high agglomeration of $TiO_2$ results, the $TiO_2$ must be milled or ground in an energy intensive, expensive process such as micronizing to reduce the size of agglomerates in order to achieve the desired pigment properties. Further, two crystal structures of $TiO_2$ may form: rutile and anatase. The rutile $TiO_2$ is preferred for its higher durability and its higher refractive index, both of which are important performance characteristics. Anatase $TiO_2$ is inherently less durable than rutile $TiO_2$ and possesses a lower refractive index. The presence of the anatase phase will in particular adversely affect durability. Even low levels of anatase affects durability of a finished $TiO_2$ pigment. It is well known in the prior art that addition of a silicon compound during the oxidation stage promotes anatase formation.

Particle size has been controlled previously by premixing volatile silicon compound and $TiCl_4$ prior to reacting it with the oxygen-containing gas. For example, British Patent 689,123 discloses premixing volatile silicon and aluminum compounds with $TiCl_4$, oxidizing and resulting in $TiO_2$ pigments with greater than 90% rutile. Therein, the aluminum serves as a ruffle promoter, but also causes the formation of coarser particles and the silicon compound serves to decrease particle size.

U.S. Pat. No. 3,219,468 provides a process in a dynamic bed reactor and discloses separate addition of silicon halide from all other reactants. Therein, however, the temperature is raised to no more than 1200° C. and less than 0.3% $SiO_2$ is present. When higher concentrations of the silicon halide is used therein, more anatase is formed.

The need therefore exists for a process for preparing improved quality of $TiO_2$ pigment with decreased particle size and decreased agglomeration thus reducing the need for grinding operations while concomitantly eliminating the formation of anatase without loss of durability of the $TiO_2$ pigment. The present invention meets that need.

SUMMARY OF THE INVENTION

In accordance with this invention, there is provided a vapor phase process for producing substantially anatase-free $TiO_2$ comprising reacting vaporous $TiCl_4$, an oxygen containing gas and an aluminum halide in a plug flow reactor and introducing a silicon halide at a process temperature in the range from about 1200° C. to about 1600° C. and the silicon halide is added at one or more points downstream of where the oxygen containing gas and $TiCl_4$ are initially contacted.

It has been found that the process of this invention improves the quality of a $TiO_2$ pigment with decreased particle size and decreased agglomeration thus reducing the need for grinding operations while virtually eliminating the formation of anatase. Further, $TiO_2$ pigment product properties such as gloss and carbon black undertone are improved without loss of durability, and economic benefits in the $TiO_2$ manufacturing process are obtained. Surprisingly, the present process produces substantially anatase-free $TiO_2$ at a higher concentration of silicon halide addition during oxidation. The prior art results in more anatase formation at lower concentrations of a silicon compound, which is known to be an anatase promoter. Another advantage of the present process is the flexibility of modifying the amount of silica added at a subsequent surface treatment step. Reduced silica added during surface treatment results in easier grinding. It has been further discovered that introducing the silicon halide at one or more points downstream of where the oxygen and $TiCl_4$ are initially contacted virtually eliminates fouling of a reaction zone, i.e., silica adheres to the inside of a reaction vessel and tends to plug the reaction vessel when the silicon halide is introduced with the $TiCl_4$.

DETAILED DESCRIPTION

The production of $TiO_2$ by the vapor phase oxidation of $TiCl_4$ is well known and disclosed in U.S. Pat. Nos. 2,488,439 and 2,559,638, the teachings of which are incorporated herein by reference. The present invention relates specifically to an improvement in the aforementioned processes.

$TiCl_4$ is evaporated and preheated to temperatures of from about 300 to about 650° C. and introduced into a reaction zone of a reaction vessel. Aluminum halide such as $AlCl_3$, $AlBr_3$ and $AlI_3$, preferably $AlCl_3$, in amounts sufficient to provide about 0.5 to about 10% $Al_2O_3$, preferably about 0.5 to about 5%, and more preferably about 0.5 to about 2% by weight based on total solids formed in the oxidation reaction is thoroughly mixed with $TiCl_4$ prior to its introduction into a reaction zone of the reaction vessel. In alternative embodiments, the aluminum halide may be added partially or completely with the silicon halide downstream.

The oxygen containing gas is preheated to at least 1200° C. and is continuously introduced into the reaction zone through a separate inlet from an inlet for the $TiCl_4$ feed stream. Water tends to have a rutile promoting effect. It is desirable that the reactants be hydrous. For example, the oxygen containing gas comprises hydrogen in the form of $H_2O$ and can range from about 0.01 to 0.3 wt % hydrogen based on $TiO_2$ produced, preferably 0.02–0.2 wt %. Optionally, the oxygen containing gas can also contain a vaporized alkali metal salt such as inorganic potassium salts, organic potassium salts and the like, particularly preferred are CsCl or KCl, etc. to act as a nucleant.

In carrying out the invention, the silicon halide is added downstream from the $TiCl_4$ stream addition. The exact point of silicon halide addition will depend on the reactor design, flow rate, temperatures, pressures and production rates, but can be determined readily by testing to obtain substantially anatase-free $TiO_2$ and the desired affects on agglomeration and particle size. For example, the silicon halide may be added at one or more points downstream from where the $TiCl_4$ and oxygen containing gas are initially contacted. Specifically, the temperature of the reaction mass at the point or points of silicon halide addition will range from about 1200° C. to about 1600° C., preferably about 1400° C. to about 1600° C., at a pressure of about 5–100 psig, preferably 15–70 psig and more preferably 40–60 psig. It is believed that higher temperatures and higher pressures also assist in achieving rutile formation. Often, the point or points of addition will not exceed the downstream distance traveled by the reactants or reaction products by about 0.002 to about 2 seconds, preferably about 0.005 to about 0.3 seconds, after the initial contact of the reactants. An alternative example of determining the point of $SiCl_4$ addition is a minimum length of about 3–6 inside diameters of the flue after the $TiCl_4$ and oxygen are initially contacted.

Suitable silicon halides include $SiCl_4$, $SiBr_4$ and $SiI_4$, preferably $SiCl_4$. The $SiCl_4$ can be introduced as either a vapor or liquid. In a preferred embodiment, the $SiCl_4$ is added downstream in the conduit or flue where scouring particles or scrubs are added to minimize the buildup of $TiO_2$ in the interior of the flue during cooling as described in greater detail in U.S. Pat. No. 2,721,626, the teachings of which are incorporated herein by reference. In this embodiment the $SiCl_4$ can be added alone or at the same point with the scrubs. In liquid $SiCl_4$ addition, the liquid is dispersed finely and vaporizes quickly.

The silicon halide added becomes incorporated as silica and/or a silica mixture in the $TiO_2$ meaning the silica and/or silica mixture is dispersed in the $TiO_2$ particle and/or on the surface of $TiO_2$ as a surface coating. Often, the silicon halide will be added in an amount sufficient to provide from about 0.1 to about 10% $SiO_2$, preferably about 0.5 to 5% $SiO_2$ and more preferably about 0.5 to 3% $SiO_2$ by weight based on total solids formed in the oxidation reaction, or $TiO_2$ (basis). Typically, higher amounts of $SiO_2$ are desirable to improve the $TiO_2$ properties described herein. Feeding $SiCl_4$ downstream after $TiCl_4$ and $O_2$ are initially contacted assists in rutile formation, controls particle size and limits agglomeration.

As a result of mixing of the reactant streams, substantially complete oxidation of $TiCl_4$, $AlCl_3$ and $SiCl_4$ takes place but for conversion limitations imposed by temperature and thermochemical equilibrium. Solid particles of $TiO_2$ form. The reaction product containing a suspension of $TiO_2$ particles in a mixture of chlorine and residual gases is carried from the reaction zone at temperatures considerably in excess of 1200° C. and is subjected to fast cooling in the flue. The cooling can be accomplished by any conventional means as known in the art and described above.

The $TiO_2$ pigment is recovered from the cooled reaction products by conventional separation treatments, including cyclonic or electrostatic separating media, filtration through porous media or the like. The recovered $TiO_2$ may be subjected to surface treatment, milling, grinding or disintegration treatment to obtain the desired level of agglomeration. It will be appreciated by those skilled in the art that the silica added by the present invention offers the flexibility of reducing the amount of silica added at a subsequent surface treatment step, if desired.

Substantially anatase-free is defined herein to refer to $TiO_2$ with less than about 0.7% anatase formation, preferably 0.5% or less, and more preferably 0.2% or less anatase formation.

Plug flow reactor or pipeline reactor is defined herein to mean a reactor in the form of a conduit having a unidirectional flow at velocities of about 50 feet per second (about 15 m/s) or higher and exhibiting substantially little or no backmixing.

$TiO_2$ pigment products are tested for Carbon Black Undertone (CBU), a measure of particle size. The higher the CBU, the smaller the particles. A typical CBU for $TiO_2$ used in paint is about 10. CBU is determined by mulling together a suitable liquid, such as light colored oil and standard weights of the sample and a standard carbon black. The mixture is spread with a standard mixture on a panel and the relative blueness of the gray mixtures observed. Fine particles give bluer undertone or higher CBU. CBU values set forth in the Examples are determined by the methods described in greater detail in U.S. Pat. No. 2,488,440, the teachings of which incorporated herein by reference except using a rating or value of 10 rather than 100 as used therein.

Particle size distribution of the pigment products is measured by sedimentation analysis, with a Sedigraph® (Micromeritics Instrument Corp., Norcross, Ga.) after dispersion in aqueous suspension by fixed level sonication. The particle size measurement of the oxidation base and the %>0.6 microns fraction will indicate the potential for peak gloss in the finished product, a value that cannot be exceeded while applying any reasonable energy level. In addition, less grinding energy is required for improving the quality of the oxidation base.

To a clearer understanding of the invention, the following Examples are construed as illustrative and not limitative of the underlying principles of the invention.

EXAMPLES

COMPARATIVE EXAMPLE 1

$SiCl_4$ was premixed with $TiCl_4$ feed in an amount sufficient to provide 0.17% by weight $SiO_2$ based on total solids formed in the oxidation reaction. The $TiCl_4$ feed also contained $AlCl_3$ thoroughly premixed in an amount sufficient to provide 1.2% by weight $Al_2O_3$ based on total solids formed in the oxidation reaction. The $TiCl_4$ feed was evaporated and preheated to 460° C. and introduced to a reaction zone at a rate corresponding to the production rate of 10 tons/hr of $TiO_2$ pigment product. Simultaneously, preheated oxygen was continuously introduced through a separate inlet adjacent to the $TiCl_4$ inlet. Trace mounts of KCl dissolved in water were added to the oxygen stream as disclosed in British Patent 922,671 and U.S. Pat. No. 3,208,866, the teachings of which are incorporated herein by reference. The temperature of the reaction mass at the point where the $SiCl_4$ was added was about 800°–900° C. The reactant streams were rapidly mixed. At a location 5 feet (1.5 meters) downstream (or about 0.02–0.04 seconds from the point at which the $TiCl_4$ and oxygen are initially contacted) a reaction temperature of about 1180° C. was estimated for the reaction zone and the pressure was 22 psig. The gaseous suspension of titanium dioxide pigment formed in the reactor was discharged and quickly cooled. The $TiO_2$ pigment was separated from the cooled gaseous products by conventional means. The recovered $TiO_2$ pigment was then treated by conventional pigment treatment procedures and ground to desired texture. Upon addition of the $SiCl_4$, the CBU of the product was 8 with 3.0% anatase formation as detected by powder X-ray diffraction.

COMPARATIVE EXAMPLE 2

The process of Comparative Example 1 was repeated except $SiCl_4$ was premixed with $TiCl_4$ feed in an amount sufficient to provide 0.5% by weight $SiO_2$ and 1% by weight $Al_2O_3$ based on total solids formed in the oxidation reaction. The $TiCl_4$ feed was evaporated and preheated to 400° to 430° C. and introduced to a reaction zone at a rate corresponding to the production rate of 4 tons/hr of $TiO_2$ pigment product. Further, at a location 5 feet (1.5 meters) downstream (or about 0.02–0.04 seconds from the point at which the $TiCl_4$ and oxygen are initially contacted) a reaction temperature of about 1400° to 1500° C. was estimated for the reaction zone and the pressure was 45 psig. Upon addition of the $SiCl_4$, the CBU of the product improved from 12.7 to 15.2 but with 0.7% anatase formation as detected by powder X-ray diffraction.

EXAMPLE 3

The process described in Comparative Example 2 was repeated with the exception that $SiCl_4$ was not added to the $TiCl_4$ feed. Instead, the $SiCl_4$ was fed to the reactor as a finely dispersed liquid at a location 5 feet (1.5 meters) downstream (or about 0.02–0.04 seconds from the point at which the $TiCl_4$ and oxygen are initially contacted) at the same point as the scrubs at a rate and at an amount sufficient to provide a loading of 1.0% by weight $SiO_2$ based on the total solids formed in the oxidation reaction. The $TiCl_4$ temperature was 425° C. and the oxygen temperature was 1590° C. for both control and test conditions. The estimated temperature of the reaction mass at the point of $SiCl_4$ injection was about 1400° to 1500° C. for the reaction zone at a pressure of about 50 psig. The production rate was 4.5 tons/hr. The CBU improved from 9.7 to 12.6 with substantially no measurable anatase formation by X-ray diffraction. The percent of particles >0.6 microns was also found to decrease from 33.5% without the addition of $SiCl_4$ to the process to 22% with the added $SiCl_4$.

DURABILITY

The product of Example 3 was subjected to a subsequent surface treatment step and a resulting finished product was subjected to long term Florida exposure chalk fade tests. The chalk fade results were comparable to chalk fade results of a finished product, i.e., a >99.8% rutile $TiO_2$ prepared under comparable conditions described in Example 3 but without $SiCl_4$ addition. This demonstrates there is no loss of durability of the product prepared by the process of the present invention. In a further comparison, an anatase pigment, Kronos 1070 (available from Kronos, Leverkuesen, Germany) was tested for chalk fade and it chalked so readily that a chalk fade value could not be calculated. This demonstrates that rutile $TiO_2$ has higher durability than anatase $TiO_2$.

Having thus described and exemplified the invention with a certain degree of particularity, it should be appreciated that the following claims are not to be limited but are to be afforded a scope commensurate with the wording of each element of the claims and equivalents thereof.

I claim:

1. A vapor phase process for producing substantially anatase-free $TiO_2$ comprising reacting vaporous $TiCl_4$, an oxygen containing gas and an aluminum halide in a plug flow reactor and introducing a silicon halide at a process temperature in the range from about 1200° C. to about 1600° C. and the silicon halide is added at one or more points downstream of where the oxygen containing gas and $TiCl_4$ are initially contacted wherein substantially anatase-free $TiO_2$ is produced.

2. The process of claim 1 wherein the silicon halide is $SiCl_4$ and is added in an amount sufficient to provide about 0.1 to 10.0% by weight $SiO_2$.

3. The process of claim 2 wherein the $SiCl_4$ is added in an amount sufficient to provide about 0.5 to 5.0% by weight $SiO_2$ and the process temperature is about 1400° C. to about 1600° C.

4. The process of claim 3 wherein the $SiCl_4$ is added in an amount to provide about 0.5 to 3% by weight $SiO_2$.

5. The process of any of claim 4 wherein the aluminum halide is premixed with the $TiCl_4$ and the oxygen containing gas further comprises a vaporized alkali metal salt.

6. The process of claim 5 wherein the aluminum halide is $AlCl_3$ and is added in an amount sufficient to provide about 0.5 to 10% by weight $Al_2O_3$.

7. The process of claim 6 wherein the $SiCl_4$ is added at a point where scrubs are introduced in a cooling conduit.

8. The process of claim 1 wherein the amount of silica added at a subsequent surface treatment step is reduced.

* * * * *